Figure 3:
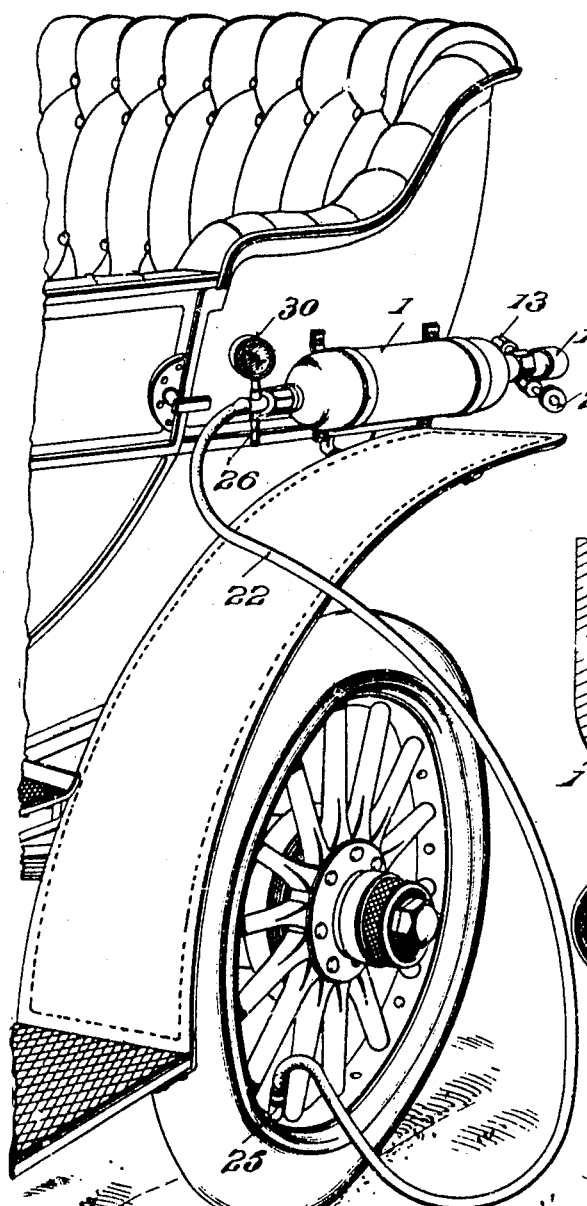

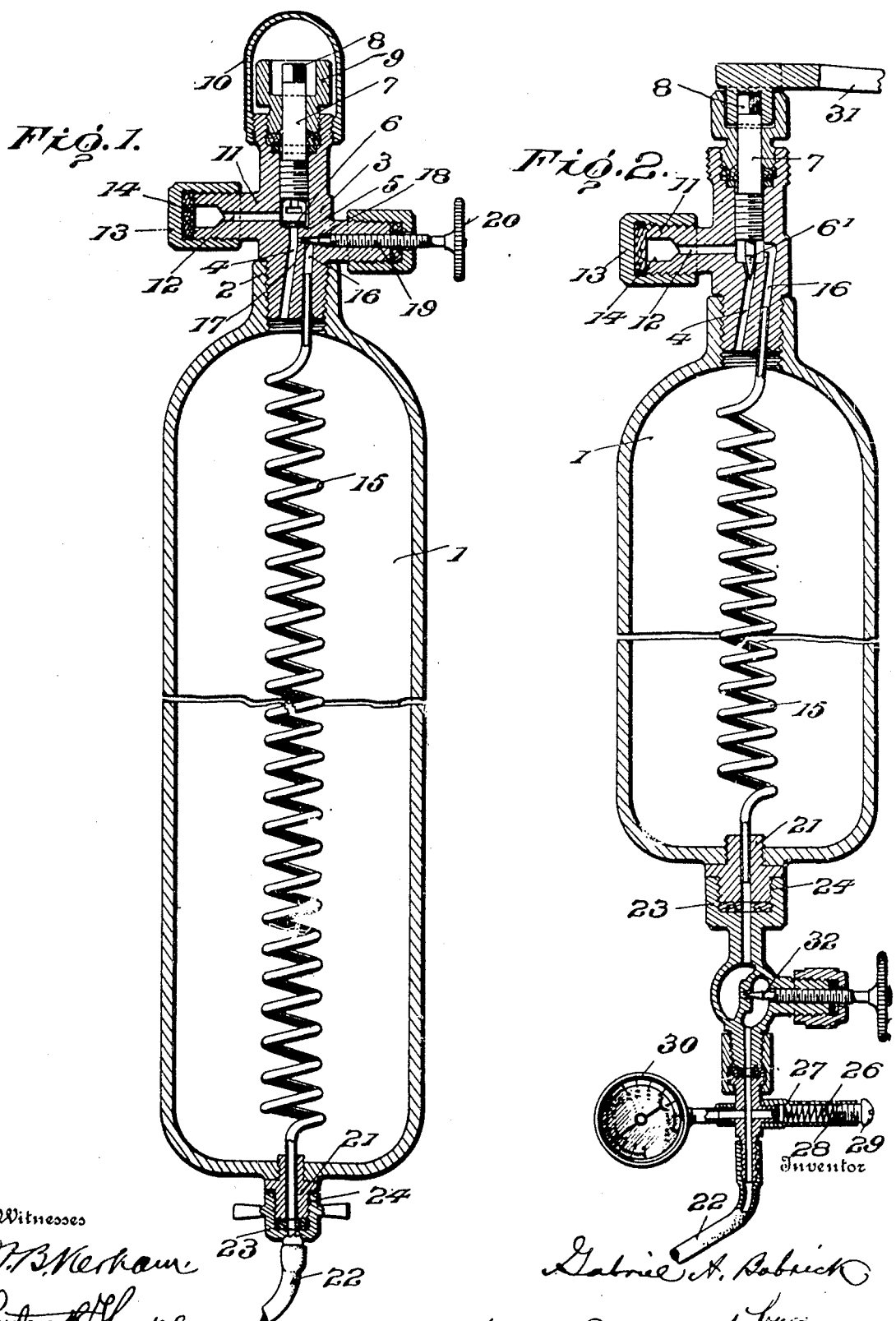

No. 867,942. PATENTED OCT. 15, 1907.
G. A. BOBRICK.
COMPRESSED FLUID CHARGING AND DISCHARGING DEVICE.
APPLICATION FILED DEC. 21, 1906.

2 SHEETS—SHEET 2.

Witnesses
W. B. Kerkam
Gustave K. Thompson

Inventor
Gabriel A. Bobrick
By Munn & Cameron Lewis Massie
His Attorneys

UNITED STATES PATENT OFFICE.

GABRIEL A. BOBRICK, OF LOS ANGELES, CALIFORNIA.

COMPRESSED-FLUID CHARGING AND DISCHARGING DEVICE.

No. 867,942.  Specification of Letters Patent.  Patented Oct. 15, 1907.

Application filed December 21, 1906. Serial No. 348,994.

*To all whom it may concern:*

Be it known that I, GABRIEL A. BOBRICK, of Los Angeles, California, have invented a new and useful Improvement in Compressed-Fluid Charging and Discharging Devices, which improvement is fully set forth in the following specification.

This invention relates to means for inflating tires of automobiles and like structures. In my United States Patent No. 802,905, dated October 24, 1905, I have shown, described and claimed a means designed for this end.

The object of the present invention is to provide a structure of the class mentioned which shall be less expensive to construct, more simple in its operation, and containing fewer parts, to the end that the desired objects may be accomplished with a device which may be put upon the market at a less price than that of my aforementioned patent, and which shall be simpler to operate, and thus in the hands of inexperienced or careless operators less liable to damage.

It has been found that the reducing valve employed in the structure of my previous patent, while highly efficient for the accomplishment of the ends desired when in the hands of an experienced operator, is nevertheless the part of the device which is most frequently damaged by an inexperienced or careless operator, and one of the objects of the present invention is to eliminate the reducing valve, and thereby render impossible such injury to the device as was heretofore possible when a reducing valve was used.

As is well known, when a liquefied or compressed gas expands a reduction of temperature results, and this low temperature is injurious to the conduits such as rubber, which are ordinarily employed for conveying the expanded gas to the tire. Furthermore, it is desirable that the expanded gas which enters the tire should not be at a temperature less than that of the surrounding atmosphere, as otherwise the increase of temperature of the gas after it enters the tire produces an undesired pressure in the tire; and particularly is it undesirable that any liquefied gas should enter the tire. Means were provided in my aforementioned patent for neutralizing the cold incident to expansion of the compressed gas and preventing the entrance of liquid gas into the tire, and one of the objects of the present invention is to simplify such means and thereby reduce the cost of construction and its liability to get out of order.

With the aforementioned objects in view, the invention consists, broadly stated, in a tire-inflating device comprising a reservoir for liquefied or compressed gas, a device for permitting gas from the reservoir to expand on its way to the tire, and means for utilizing the heat of the liquefied or compressed gas in the reservoir to neutralize the cold due to expansion.

Furthermore, the invention consists in combining a safety valve with a device of the character above mentioned, if desired, to the end that the degree of pressure for inflating the tire may be controlled by the safety valve. There may be, and in some instances preferably is, a suitable gage also connected with the device, to the end that the pressure of the gas delivered to the tire may be readily seen from the gage.

With a view to permitting the rapid charging or recharging of the reservoir with liquefied or compressed gas and at the same time providing means whereby the escape of the gas (and therefore its rate of expansion) may be also effectively controlled, the invention further consists in a combination of conduits and valves designed for this purpose, the construction of which will be hereinafter more specifically described and then pointed out in the claims. In order that the heat of the liquefied or compressed gas may be utilized to neutralize the reduction in temperature due to expansion, a portion of the conduit through which the expanded gas is conducted from the reservoir to the tire is passed through the liquid or gas contained in the reservoir. This conduit is preferably in the form of a coil, in order that an extended surface of the conduit may be exposed to the temperature of the liquid or gas within the reservoir.

The inventive idea involved is capable of receiving a variety of mechanical expressions without in any way departing from the true spirit of the invention, and for the purpose of illustrating the invention the accompanying drawings have been prepared, but it is to be understood that such drawings are for the purpose of illustration only, and not for the purpose of defining the limits of the invention, reference being had to the claims for this purpose.

Figure 5:
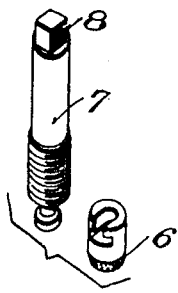
Figure 6:
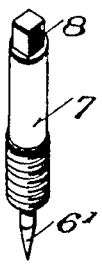
Figure 4:
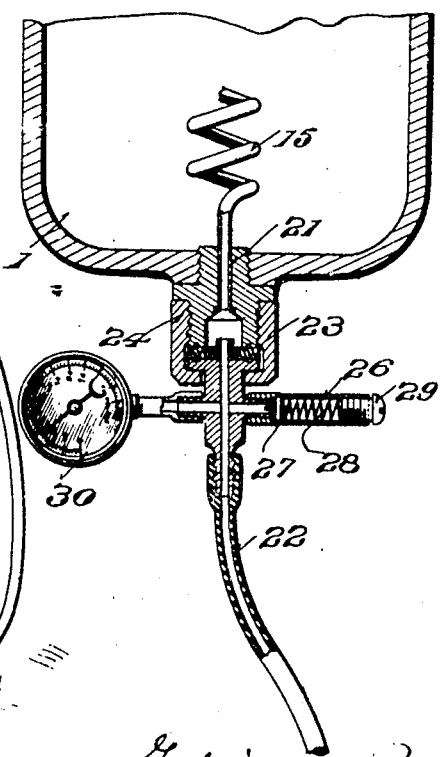

In said drawings Figure 1 represents a central longitudinal section of the device with parts shown in elevation; Fig. 2 is a similar section of another expression of the inventive idea; and Fig. 3 shows the device in position upon an automobile in the act of inflating the tire; Fig. 4 is a broken sectional view showing a safety valve and a gage attached to the lower part of the construction shown in Fig. 1; Fig. 5 is a detail illustrating the construction of valve employed to control the charging conduit of Fig. 1; and Fig. 6 illustrates a valve which may be employed not only for controlling the charging conduit, but also for controlling the expansion of the gas when the device is being employed to inflate the tire as shown in Fig. 2.

Referring to the drawings, 1 is a closed tank or receptacle of any suitable construction and preferably provided with a neck 2 having an interior or female screw-thread therein, and 3 is a plug or casting screwed into the neck 2 so as to form a gas-tight joint, suitable packing being employed for this purpose, if desired. Within the casting 3 is formed a conduit 4 communicating at one end with the interior of the receptacle 1 and having formed at the other end thereof a valve seat 5 and upon which may be seated a valve 6. This valve is preferably formed at the end of a screw-threaded rod or stem 7 formed at the end 8 so as to receive a wrench or other means for turning the plug, and is connected to said rod by a swivel joint of a common and well-known construction. If desired, however, the valve may be in the form of a needle-valve 6', shown in Fig. 6. Preferably the end 8 of the valve stem 7 is protected by means of a flanged plug 9 so constructed that the flange entirely surrounds the end 8 of the plug, to the end that the plug can only be reached and operated by a specially devised wrench or other operating instrument designed for that purpose. Preferably, also, this flanged sleeve 9 and the end 8 of the valve stem are entirely inclosed in a cap 10, preferably screw-threaded upon the exterior end of the casting 3.

Formed within an arm 11 of the casting 3 is a charging conduit 12 in free and open communication with the conduit 4 when the valve 6 is raised from its seat, which conduit, except during the time of charging, is closed by a cap 13 provided with a suitable packing 14. By removing the cap 13 and connecting the conduit 12 with the charging apparatus the compressed or liquefied gas passes through the conduit 12 under the raised valve 6 and through the conduit 4 to the interior of the receptacle 1.

Within the receptacle 1 there is arranged a conduit 15 through which the expanded gas passes on its way to the tire. Preferably this conduit is in the form of a coil, to the end that a large surface of the conduit may be exposed to the fluid within the tank or receptacle. This conduit 15 is in communication with the conduit 4 by way of conduit 16 formed in the casting 3, and a valve-seat 17, while a needle valve 18 is provided for controlling the passage of gas from the receptacle 1 to conduit 15. This needle valve is preferably at the end of a screw-threaded stem 19 whose threads are of so fine a pitch that the opening for the expansion of the gas may be controlled to a nicety by such valve, said screw-stem being provided with a suitable milled wheel 20 for the operation of the valve.

The conduit 15 passes from the valve 18 through the reservoir 1 and out at the opposite end. It is essential that the conduit 15 be passed through the end of reservoir 1 with an air-tight joint, and as one desirable means for accomplishing this end there is provided a screw-threaded bushing 21 which is screwed into the end of the receptacle and the end of the conduit 15 is passed through the bushing and secured thereto in any effectual manner, as by soldering the end of conduit 15 to the bushing. The conduit for conducting the gas from the conduit 15 to the tire is preferably attached at this point. As ordinarily employed, this conduit 22 is a flexible rubber hose, though obviously it may be composed of any suitable material, and may be formed partly of metal and partly of flexible rubber hose, as shown in Fig. 2. To the end of this hose is secured a coupling device 23 in any suitable manner, and the said coupling device 23 is then detachably secured, as by screw-threads 24, to the bushing 21, the opposite end of the conduit 22 being attached in the usual or in any suitable manner to the valve 25 on the tire.

With the device as thus formed or constructed, an experienced operator can readily inflate the tire to approximately the desired pressure, but when it is desired to provide means for avoiding the inflation of the tire beyond a predetermined point, a safety valve 26, Figs. 2 and 4, of any suitable or well-known construction is employed. As here shown, said valve consists of a valve 27 held to its seat by a spring 28 whose tension is controlled by a screw-plug 29, to the end that the amount of pressure upon the valve may be controlled. The safety valve seat is in open communication with the exit end of the conduit 15 leading from the receptacle 1. It will be apparent that since the valve proper 27 will be raised from its seat at the predetermined pressure, the pressure of the gas within the inflated tire cannot exceed the pressure at which the safety valve is adjusted.

If desired, a gage 30, for indicating the pressure of the gas for inflating the tire, may also be connected at the end of conduit 15, as shown in Figs. 2, 3 and 4.

In the construction shown in Fig. 1, the valve 6 is open during the charging operation, after which it is firmly seated, and in order that the fluid within the receptacle may expand into the conduit 15 for inflating a tire, the needle valve 17 is opened to the desired extent so that the charging conduit is controlled by one valve 6 and the expansion of the gas into the conduit 15 is controlled by a separate valve 18. If desired, however, the charging conduit 4 and the expansion of the gas into the discharging conduit 15 may both be controlled by the single valve 6', as illustrated in Fig. 2. In this case the communication between the channels 4 and 16 is controlled by the neele valve 6, and after the receptacle 1 has been charged the needle valve 6' is closed. When used in this manner the valve 6 is firmly seated after the receptacle 1 has been charged and when it is desired to inflate the tire the valve 6 is slightly lifted from its seat by manipulating the valve stem with a wrench 31, or otherwise, when the gas expands past the valve 6' and enters the conduit 15, as heretofore explained. In this instance, there is provided at the exit end of conduit 15 a valve 32, to the end that the conduit 15 may be closed during the operation of charging the receptacle 1, and also to the end that when the tire has become inflated to the desired extent the flow of expanding gas to the tire may be quickly shut off.

It will be perceived that by the use of the construction hereinbefore described the reservoir for liquefied or compressed gas may be quickly and rapidly charged, and when it is desired to inflate the tire the gas may be allowed to expand at any desired rate into a conduit so situated that it will be practically at all times at the temperature of the fluid contained within the reservoir or the temperature of the surrounding atmosphere. Moreover, it will be perceived that the exact degree of pressure within the tire may, if desired, be determined by the use of a simple safety valve and that this pressure may be readily indicated by an ordinary gage of simple construction. Moreover, it will be perceived that in the simpler form of construction shown in Fig. 1, there is but a single valve to be operated by the person inflating the tire, and that there are no parts exposed to damage, nor can the operator unintentionally manipulate the same so as to damage the device. While the device as illustrated may lack some of the desirable features described in my Patent No. 802,905, heretofore mentioned, it is nevertheless much simpler in construction, and hence much cheaper to build and less liable to get out of order.

It will be understood that while for the purpose of illustration reservoir 1 is shown as mounted upon an automobile, this is not essential, since it may be either mounted as shown, or it may be carried loose in the automobile, or it may even be retained at the garage. Furthermore, it will be appreciated that while the device has been herein specifically described as designed for the purpose of inflating tires of automobiles and like structures, it is nevertheless apparent that it is capable of other uses where it may be desired to charge a receptacle through a large and free opening and discharge the same through a restricted opening to the end that expansion of the fluid contained in the receptacle may not be too rapid. As an example of this latter use, I might mention nitrous oxid tanks employed by dentists in which the fluid is charged into the receptacle in the form of a liquid, and hence should be admitted through a large and free opening, while it is discharged therefrom in the form of a gas under low pressure, and hence it is desirable to pass it through a small or restricted discharge opening.

What is claimed is:

1. In a device of the character described, the combination of a reservoir for a liquefied or compressed gas, with a manually-operable gas-expansion device, and means utilizing the heat of the liquefied or compressed gas in the reservoir to neutralize the cold due to expansion.

2. In a device of the character described, the combination of a reservoir for a liquefied or compressed gas, with a manually-operable gas-expansion device, and a conduit leading from said expansion device through the liquefied or compressed gas in the reservoir, whereby the temperature of the latter will act to raise the temperature of the expanded gas.

3. In a device of the character described, the combination of a reservoir for a liquefied or compressed gas, with a gas-expansion device, and a tubular coil constituting a conduit leading from said expansion device through the liquefied or compressed gas in the reservoir, whereby the temperature of the latter will act to raise the temperature of the expanded gas.

4. In a device of the character described, the combination of a reservoir for a liquefied or compressed gas, with a manually-operable valve permitting the expansion of said gas from the reservoir, and means utilizing the heat of the liquefied or compressed gas in the reservoir to neutralize the cold due to expansion.

5. In a device of the character described, the combination of a reservoir for liquefied or compressed gas having a discharge orifice, a manually-operable valve controlling the expansion of the gas from the reservoir through said orifice, and a conduit leading through said reservoir from said orifice, whereby the cold due to expansion of the gas is neutralized by the heat of the fluid in the reservoir.

6. In a device of the character described, the combination of a reservoir for liquefied or compressed gas having a discharge orifice, a valve controlling the expansion of the gas from the reservoir through said orifice, a coiled tube constituting a conduit leading from said orifice through said reservoir and having its discharge end projecting outward through the wall of the reservoir.

7. In a device of the character described, the combination of a reservoir for liquefied or compressed gas, with a valve casing having a duct therein provided with a port opening into the reservoir, a conduit leading from said duct through the reservoir, and a valve controlling the passage of gas through said duct.

8. In a device of the character described, the combination of a reservoir for liquefied or compressed gas, a valve casing connected to said reservoir and having an inlet duct leading from the exterior of the casing and opening into the reservoir, an outlet or expansion duct in said casing in communication with said inlet duct, and a valve controlling the passage of gas from the reservoir to the outlet duct via said inlet duct.

9. In a device of the character described, the combination of a reservoir for liquefied or compressed gas, a valve casing connected to said reservoir and having an inlet duct leading from the exterior of the casing and opening into the reservoir, a valve controlling said inlet duct, an outlet or expansion duct in said casing in communication with said inlet duct, and a valve controlling the passage of gas from the reservoir via the inlet duct to the outlet duct.

10. In a device of the character described, the combination of a reservoir for liquefied or compressed gas, a valve casing connected to said reservoir and having an inlet duct leading from the exterior to the interior of said casing, a valve controlling said duct and having an operating part projecting from the casing, a cap or shield inclosing said operating part, an outlet duct, a valve controlling said outlet duct, and means exposed on the exterior of said casing for operating said last-mentioned valve.

11. In a device of the character described, the combination of a reservoir for liquefied or compressed gas, with a gas-expansion device, a conduit leading from said expansion device through the liquefied or compressed gas in the reservoir, and a pressure-relief device connected to said conduit.

12. In a device of the character described, the combination of a reservoir for liquefied or compressed gas, with a gas expansion device, a conduit leading from said expansion device through the liquefied or compressed gas in the reservoir, and a pressure-indicating device connected to said conduit.

13. In a device of the character described, the combination of a receptacle for a liquefied or compressed gas, and a conduit relatively immovable to said receptacle leading from the interior of said receptacle to the exterior thereof, said conduit being located for a portion of its length within the area of said receptacle, whereby the gas passing outward through said conduit will have imparted to it approximately the temperature of the fluid in the receptacle.

In testimony whereof I have signed this specification in the presence of two subscribing witnesses.

GABRIEL A. BOBRICK.

Witnesses:
S. T. CAMERON,
W. B. KERKAM.